US012687611B2

(12) United States Patent
Wang et al.

(10) Patent No.: US 12,687,611 B2
(45) Date of Patent: Jul. 21, 2026

(54) DISPLACEMENT MONITORING METHOD BASED ON ELLIPTICAL TRAJECTORY CALIBRATION AND MODIFIED PRINCIPAL COMPONENT ANALYSIS

(71) Applicant: NATIONAL SUN YAT-SEN UNIVERSITY, Kaohsiung (TW)

(72) Inventors: Fu-Kang Wang, Kaohsiung (TW); Ji-Xun Zhong, Kaohsiung (TW); Ju-Yin Shih, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 217 days.

(21) Appl. No.: 18/766,850

(22) Filed: Jul. 9, 2024

(65) Prior Publication Data

US 2025/0199119 A1    Jun. 19, 2025

(30) Foreign Application Priority Data

Dec. 19, 2023    (TW) ................................. 112149604

(51) Int. Cl.
*G01S 7/40* (2006.01)
*G01S 13/02* (2006.01)

(52) U.S. Cl.
CPC ................ *G01S 7/40* (2013.01); *G01S 13/02* (2013.01)

(58) Field of Classification Search
CPC .................................. G01S 7/40; G01S 13/02
See application file for complete search history.

(56) References Cited

U.S. PATENT DOCUMENTS

| | | | |
|---|---|---|---|
| 2008/0074307 A1 | 3/2008 | Boric-Lubecke et al. | |
| 2010/0152600 A1* | 6/2010 | Droitcour ............ | A61B 5/7221 |
| | | | 600/534 |
| 2011/0143701 A1* | 6/2011 | Caruthers ........... | H04L 27/3872 |
| | | | 455/311 |

(Continued)

FOREIGN PATENT DOCUMENTS

| | | |
|---|---|---|
| CN | 107407723 B | 5/2021 |
| TW | 201350795 A | 12/2013 |

OTHER PUBLICATIONS

Ji-Xun Zhong et al., Four-Channel Phase and Quadrature Self-Injection-Locked (PQSIL) Radar for Displacement Monitoring Using a Modified Principal Component Analysis (MPCA) Method, IEEE Transactions on Microwave Theory and Techniques, Oct. 4, 2023.

(Continued)

*Primary Examiner* — Vladimir Magloire
*Assistant Examiner* — Eric K Hodac
(74) *Attorney, Agent, or Firm* — Demian K. Jackson; Jackson IPG PLLC

(57) ABSTRACT

In a displacement monitoring method based on elliptical trajectory calibration and modified principal component analysis, four channels are compressed into two set signals through linear combination to solve null point issue in Doppler radar and cancel clutter effect. The two sets linear combined signals make two tilted elliptical trajectories which can be calibrated for DC offset, amplitude imbalance and phase imbalance using simple computation. Due to the elliptical trajectories are mirror symmetric tilt ellipses, the residual clutter can be cancelled to recover a clear Doppler phase after demodulation and combination.

10 Claims, 8 Drawing Sheets

(56)  References Cited

U.S. PATENT DOCUMENTS

| 2020/0103493 A1 | 4/2020 | Wang et al. |
| 2022/0044422 A1 | 2/2022 | Yang et al. |
| 2023/0236215 A1 | 7/2023 | Strong et al. |

OTHER PUBLICATIONS

Taiwanese office action mailed Oct. 11, 2024 for Taiwanese patent application No. 112149604, 4 pages.

* cited by examiner

DISPLACEMENT MONITORING METHOD BASED ON ELLIPTICAL TRAJECTORY CALIBRATION AND MODIFIED PRINCIPAL COMPONENT ANALYSIS

CROSS-REFERENCE TO RELATED APPLICATIONS

This application claims priority to R.O.C patent application No. 112149604 filed Dec. 19, 2023, the disclosure of which is hereby incorporated by reference in its entirety.

FIELD OF THE INVENTION

This invention relates to a displacement monitoring method, and more particularly to a displacement monitoring method based on elliptical trajectory calibration and modified principal component analysis.

BACKGROUND OF THE INVENTION

Continuous-wave (CW) radar is widely used in displacement monitoring, and a common method employed to solve the null point issue in CW radar is the use of two channels with in-phase (I) and quadrature (Q) phase signals. However, DC offset and clutter in the environment may cause distortion of phase demodulated result and further cause displacement monitoring error. In previous study, IQ signals are calibrated to circle trajectory using Gram-Schmidt calibration process to solve phase and amplitude difference between two channels, DC offset component in IQ signals with circle trajectory is cancelled using circular trajectory fitting method and the IQ signals are demodulated to extract the Doppler phase. Gram-Schmidt calibration process involves complex computation, spends more time, and is unavailable to fully solve distortion caused by severe clutter according to two-channel data.

SUMMARY OF THE INVENTION

One object of the present invention is to compress four channels of a radar into two sets effective signals through linear combination. Trajectories of the two sets effective signals are ellipses tilted in opposite directions, thus elliptical trajectory calibration can be achieved using simple computation to calibrate DC offset, amplitude imbalance and phase imbalance, thereby recovering the Doppler phase.

A displacement monitoring method based on elliptical trajectory calibration and modified principal component analysis includes the steps of: outputting first to fourth voltage signals with a phase difference with each other from a radar to a computing device, the first to fourth voltage signals have a Doppler phase; linear combining three of the first to fourth voltage signals into first to fourth linear combined voltage signals by the computing device, wherein a first elliptical trajectory is plotted with the first and second linear combined voltage signals and a second elliptical trajectory is plotted with the third and fourth linear combined voltage signals; estimating centers of the first and second elliptical trajectories by the computing device, the computing device is configured to apply a DC offset calibration on the first and second linear combined voltage signals using the center of the first elliptical trajectory to obtain a first DC offset calibrated signal and a second DC offset calibrated signal, and the computing device is configured to apply a DC offset calibration on the third and fourth linear combined voltage signals using the center of the second elliptical trajectory to obtain a third DC offset calibrated signal and a fourth DC offset calibrated signal, wherein a third elliptical trajectory is plotted with the first and second DC offset calibrated signals and a fourth elliptical trajectory is plotted with the third and fourth DC offset calibrated signals; calculating a first minimum bounding box of the third elliptical trajectory and a second minimum bounding box of the fourth elliptical trajectory by the computing device, the computing device is configured to calibrate amplitude imbalance between the first and second DC offset calibrated signals using the first minimum bounding box to obtain a first amplitude imbalance calibrated signal and a second amplitude imbalance calibrated signal, the computing device is configured to calibrate amplitude imbalance between the third and fourth DC offset calibrated signals using the second minimum bounding box to obtain a third amplitude imbalance calibrated signal and a fourth amplitude imbalance calibrated signal, wherein a fifth elliptical trajectory is plotted with the first and second amplitude imbalance calibrated signals and a sixth elliptical trajectory is plotted with the third and fourth amplitude imbalance calibrated signals; rotating the fifth and sixth elliptical trajectories by the computing device, the computing device is configured to calibrate phase imbalance between the first and second amplitude imbalance calibrated signals by rotating the fifth elliptical trajectory to obtain a first phase imbalance calibrated signal and a second phase imbalance calibrated signal, the computing device is configured to calibrate phase imbalance between the third and fourth amplitude imbalance calibrated signals by rotating the sixth elliptical trajectory to obtain a third phase imbalance calibrated signal and a fourth phase imbalance calibrated signal, wherein a seventh elliptical trajectory is plotted with the first and second phase imbalance calibrated signals and an eighth elliptical trajectory is plotted with the third and fourth phase imbalance calibrated signals; calculating a third minimum bounding box of the seventh elliptical trajectory and a fourth minimum bounding box of the eighth elliptical trajectory by the computing device, the computing device is configured to calibrate amplitude imbalance between the first and second phase imbalance calibrated signals using the third minimum bounding box to obtain a fifth amplitude imbalance calibrated signal and a sixth amplitude imbalance calibrated signal, the computing device is configured to calibrate amplitude imbalance between the third and fourth phase imbalance calibrated signals using the fourth minimum bounding box to obtain a seventh amplitude imbalance calibrated signal and an eighth amplitude imbalance calibrated signal; phase demodulating the fifth and sixth amplitude imbalance calibrated signals to obtain a first phase demodulated signal and phase demodulating the seventh and eighth amplitude imbalance calibrated signals to obtain a second phase demodulated signal by the computing device; and combining the first and second phase demodulated signals to recover the Doppler phase by the computing device.

The voltage signals are linear-combined and compressed into two sets signals to avoid null point issue during displacement monitoring. Trajectories of the two sets signals are tilted ellipses with mirror symmetry, hence DC offset, amplitude imbalance and phase imbalance can be calibrated through simple computation, and clutter effect can be cancelled after demodulation of the two sets signals and combination of the demodulated signals. In the present invention, rapid and accurate displacement monitoring is feasible.

DETAILED DESCRIPTION OF THE INVENTION

Figure 1:
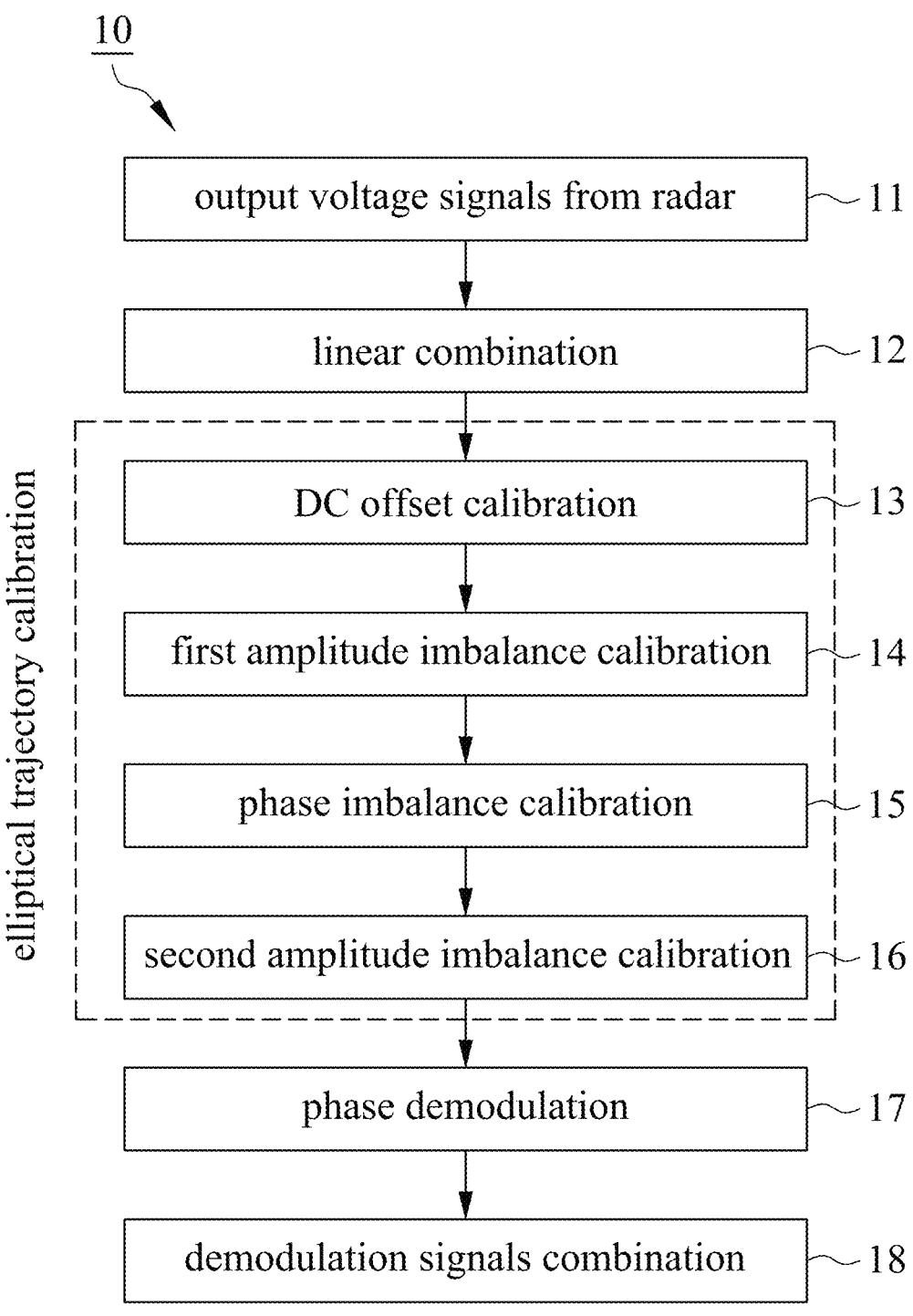
FIG. 1 is flow chart illustrating a displacement monitoring method based on elliptical trajectory calibration and modified principal component analysis in accordance with one embodiment of the present invention.

FIG. 1 is the flow chart of a displacement monitoring method 10 based on elliptical trajectory calibration and modified principal component analysis in accordance with one embodiment of the present invention. The displacement monitoring method 10 includes a step 11 of outputting voltage signals from a radar, a step 12 of linear combination, a step 13 of DC offset calibration, a step 14 of first amplitude imbalance calibration, a step 15 of phase imbalance calibration, a step 16 of second amplitude imbalance calibration, a step 17 of phase demodulation and a step 18 of demodulated signals combination. The steps 13 to 16 are the steps for elliptical trajectory calibration.

Figure 2:
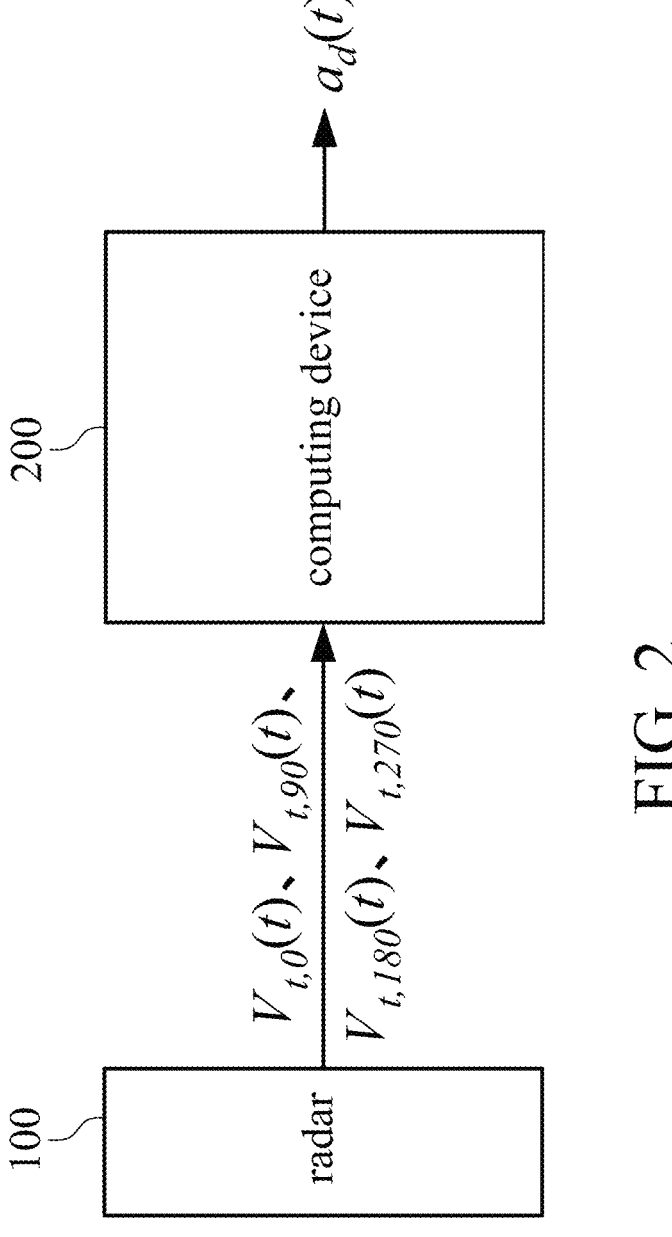
FIG. 2 is a block diagram illustrating a radar and a computing device in accordance with one embodiment of the present invention.
Figure 3:
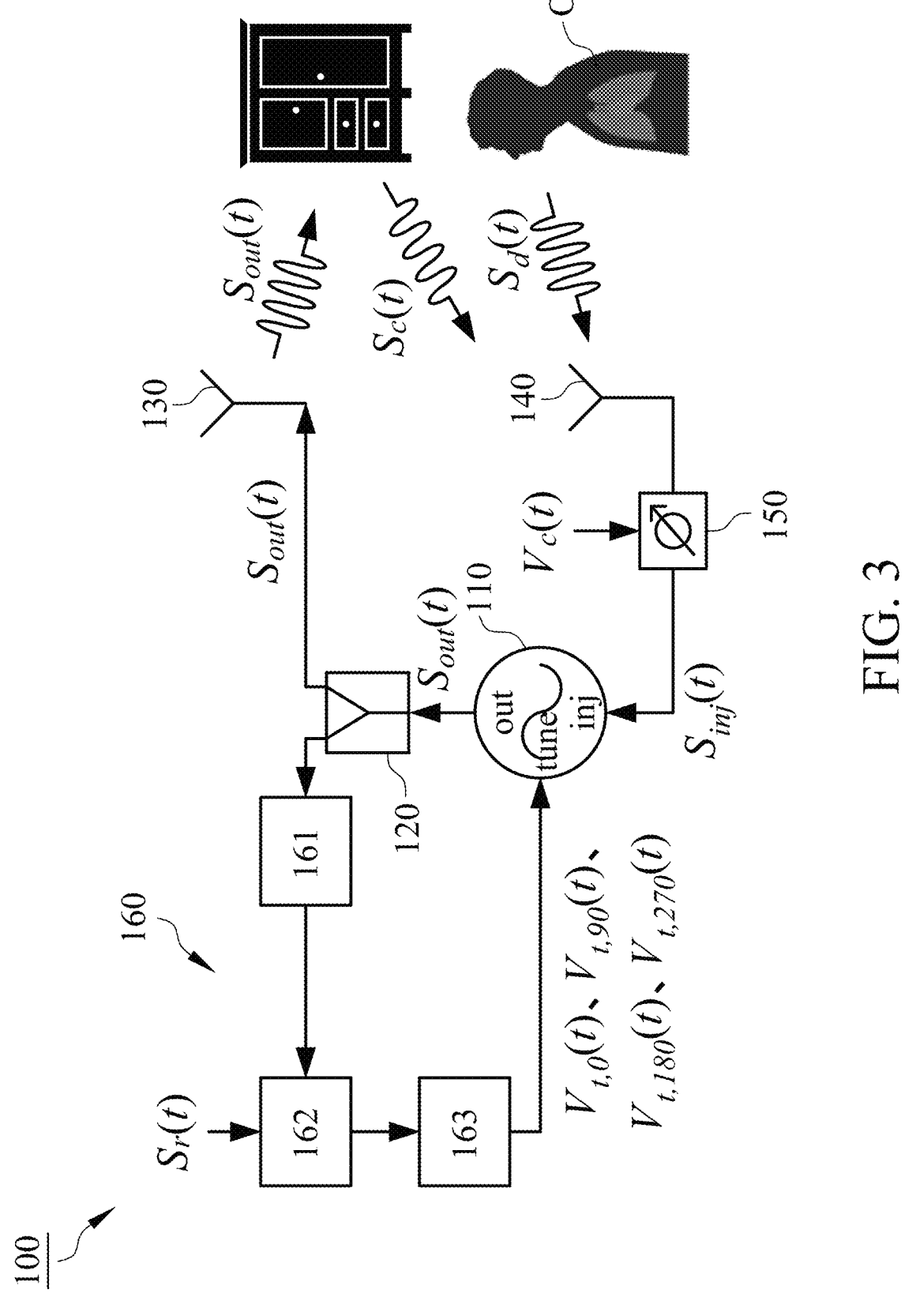
FIG. 3 is a circuit diagram illustrating a radar in accordance with one embodiment of the present invention.

With reference to FIGS. 1 and 2, a radar 100 is provided to output a first voltage signal $V_{t,0}(t)$, a second voltage signal $V_{t,90}(t)$, a third voltage signal $V_{t,180}(t)$ and a fourth voltage signal $V_{t,270}(t)$ to a computing device 200 in the step 11. Referring to FIGS. 2 and 3, the radar 100 is, but not limit to, a phase- and quadrature self-injection-locked radar (PQSIL radar), and the radar 100 may be a Doppler radar or other radar in other embodiments.

With reference to FIG. 3, the radar 100 in this embodiment includes an injection-locked oscillator 110, a power splitter 120, a transmit antenna 130, a receive antenna 140, a phase shifter 150 and a phase-locked loop circuit 160. The injection-locked oscillator 110 produces and output an oscillation signal $S_{out}(t)$ via an output port out, the power splitter 120 electrically connected to the injection-locked oscillator 110 receives and splits the oscillation signal $S_{out}(t)$ into two paths, the transmit antenna 130 electrically connected to the power splitter 120 receives and transmits the oscillation signal $S_{out}(t)$ of one path to a human body O. After transmitting the oscillation signal $S_{out}(t)$ to the human body O, a reflected signal $S_d(t)$ reflected from the human body O is received by the receive antenna 140. The phase shifter 150 electrically connected to the receive antenna 140 receives the reflected signal $S_d(t)$ and a control voltage $V_c(t)$, and the phase shifter 150 is controlled by the control voltage $V_c(t)$ to adjust the phase of the reflected signal $S_d(t)$ and output an injection signal $S_{inj}(t)$. In this embodiment, the phase shifter 150 gives a phase delay of 0, 90, 180 and 270 degrees in the reflected signal $S_d(t)$ to obtain the injection signal $S_{inj}(t)$ with four different phase delays. The injection signal $S_{inj}(t)$ is injected into an injection port inj of the injection-locked oscillator 110 to operate the injection-locked oscillator 110 in injection-locked state. Owing to the Doppler effect caused by the displacement of the human body O, the reflected signal $S_d(t)$ contains a Doppler phase associated with the displacement of the human body O, and the oscillation frequency of the injection-locked oscillator 110 is changed according to the Doppler phase while the injection signal $S_{inj}(t)$ is injected into and locks the injection-locked oscillator 110. The injection signal $S_{inj}(t)$ with four different phase delays is obtained after the phase shifter 150 producing 0, 90, 180 and 270 degrees phase delay in the reflected signal $S_d(t)$, thus the oscillation signal $S_{out}(t)$ with four phase delays of 0, 90, 180 and 270 degrees is also obtained after the injection signal $S_{inj}(t)$ is injected into to lock the injection-locked oscillator 110.

In addition, there may be an object in the environment, the oscillation signal $S_{out}(t)$ from the transmit antenna 130 is also transmitted to the object, e.g. the cabinet shown in FIG. 3, and a clutter signal $S_c(t)$ is reflected from the object and received by the receive antenna 140. The clutter signal $S_c(t)$ is delivered to the phase shifter 150, a phase delay of 0, 90, 180 and 270 degrees is given in the clutter signal $S_c(t)$ by the phase shifter 150, and the injection signal $S_{inj}(t)$ having the phase delay is injected into the injection-locked oscillator 110.

With reference to FIG. 3, the phase-locked loop circuit 160 includes a frequency divider 161, a phase-frequency discriminator 162 and a loop filter 163. The frequency divider 161 electrically connected to the power splitter 120 receives the oscillation signal $S_{out}(t)$ of the other path, divides the frequency of the oscillation signal $S_{out}(t)$ and deliver the divided oscillation signal $S_{out}(t)$ to the phase-frequency discriminator 162. The divided oscillation signal $S_{out}(t)$ is compared with the reference signal $S_r(t)$ in phase and frequency by the phase-frequency discriminator 162 and filtered by the loop filter 163. The first to fourth voltage signals $V_{t,0}(t)$, $V_{t,90}(t)$, $V_{t,180}(t)$ and $V_{t,270}(t)$ are output from the loop filter 163 and delivered to a tune port tune of the injection-locked oscillator 110 to form a phase-locked loop. The phase-locked loop circuit 160 is provided to stable the oscillation frequency of the injection-locked oscillator 110. The first to fourth voltage signals $V_{t,0}(t)$, $V_{t,90}(t)$, $V_{t,180}(t)$ and $V_{t,270}(t)$ have a phase difference between each other, preferably, the phase difference between the first and second voltage signals $V_{t,0}(t)$ and $V_{t,90}(t)$ is 90 degrees, the phase difference between the second and third voltage signals $V_{t,90}(t)$ and $V_{t,180}(t)$ is 90 degrees, the phase difference between the third and fourth voltage signals $V_{t,180}(t)$ and $V_{t,270}(t)$ is 90 degrees. The phase differences of 90 degrees can simplify subsequent computations.

The injection-locked oscillator 110 may suffer output frequency shift problem as being injection-locked by the injection signal $S_{inj}(t)$, but the first to fourth voltage signals $V_{t,0}(t)$, $V_{t,90}(t)$, $V_{t,180}(t)$ and $V_{t,270}(t)$ outputting from the phase-locked loop circuit 160 can stable the output frequency of the injection-locked oscillator 110 automatically. As a result, the first to fourth voltage signals $V_{t,0}(t)$, $V_{t,90}(t)$, $V_{t,180}(t)$ and $V_{t,270}(t)$ from the phase-locked loop circuit 160 contain the Doppler phase caused by the displacement of the human body O, and the Doppler phase can be obtained from four-channel data. The first to fourth voltage signals $V_{t,0}(t)$, $V_{t,90}(t)$, $V_{t,180}(t)$ and $V_{t,270}(t)$ can be expressed as $$V_{t,0}(t) = V_i + \frac{\omega_{LR,c}}{K_v}\sin\alpha_c(t) + \frac{\omega_{LR,d}}{K_v}C_0(t)\sin\alpha_d(t),$$

$$V_{t,90}(t) = V_i - \frac{\omega_{LR,c}}{K_v}\cos\alpha_c(t) - \frac{\omega_{LR,d}}{K_v}C_{90}(t)\cos\alpha_d(t),$$

$$V_{t,180}(t) = V_i - \frac{\omega_{LR,c}}{K_v}\sin\alpha_c(t) - \frac{\omega_{LR,d}}{K_v}C_{180}(t)\sin\alpha_d(t),$$

$$V_{t,270}(t) = V_i + \frac{\omega_{LR,c}}{K_v}\cos\alpha_c(t) + \frac{\omega_{LR,d}}{K_v}C_{270}(t)\cos\alpha_d(t),$$

where $V_i$ and $K_v$ are the initial voltage and the tuning sensitivity of the injection-locked oscillator 110, $\omega_{LR,c}$ is the locking range of the clutter signal $S_c(t)$, $\omega_{LR,d}$ is the locking range of the reflected signal $S_d(t)$, $\alpha_c(t)$ is the phase difference of the clutter signal $S_c(t)$, $\alpha_d(t)$ is the Doppler phase of the reflected signal $S_d(t)$, $C_0(t)$, $C_{90}(t)$, $C_{180}(t)$ and $C_{270}(t)$ are correction terms of the four channels and can be given as $$\begin{cases} C_0(t) = 1 - (E_c/E_{osc})\cdot\cos\alpha_c(t) \\ C_{90}(t) = 1 - (E_c/E_{osc})\cdot\sin\alpha_c(t) \\ C_{180}(t) = 1 + (E_c/E_{osc})\cdot\cos\alpha_c(t) \\ C_{270}(t) = 1 + (E_c/E_{osc})\cdot\sin\alpha_c(t) \end{cases},$$

where $E_c$ denotes the amplitude of the clutter signal $S_c(t)$, and $E_{osc}$ denotes the amplitude of the oscillation signal $S_{out}(t)$.

With reference to FIGS. 1 and 2, the computing device 200 linear combines three of the first to fourth voltage signals $V_{t,0}(t)$, $V_{t,90}(t)$, $V_{t,180}(t)$ and $V_{t,270}(t)$ into first to fourth linear combined voltage signals $V_{A1}(t)$, $V_{A2}(t)$, $V_{B1}(t)$ and $V_{B2}(t)$, respectively, in the step 12. In this embodiment, the first and third linear combined voltage signals $V_{A1}(t)$ and $V_{B1}(t)$ are derived from the linear combinations of the first to third voltage signals $V_{t,0}(t)$, $V_{t,90}(t)$ and $V_{t,180}(t)$, the second and fourth linear combined voltage signals $V_{A2}(t)$ and $V_{B2}(t)$ are derived from the linear combinations of the second to fourth voltage signals $V_{t,90}(t)$, $V_{t,180}(t)$ and $V_{t,270}(t)$. The first to fourth linear combined voltage signals $V_{A1}(t)$, $V_{A2}(t)$, $V_{B1}(t)$ and $V_{B2}(t)$ are given as $$V_{A1}(t) = V_{t,0}(t) + 2V_{t,90}(t) - V_{t,180}(t) =$$
$$2V_i + 2\frac{\omega_{LR,c}}{K_v}\sqrt{2}\sin(\alpha_c(t) - 45°) + 2\frac{\omega_{LR,d}}{K_v}\sqrt{1 + C_{90}^2(t)}\sin(\alpha_d(t) - \theta_1(t)),$$

$$V_{A2}(t) = V_{t,90}(t) - 2V_{t,180}(t) + V_{t,270}(t) =$$
$$2\frac{\omega_{LR,c}}{K_v}\sin\alpha_c(t) + 2\frac{\omega_{LR,d}}{K_v}\sqrt{C_{180}^2(t) + (1 - C_{90}(t))^2}\sin(\alpha_d(t) + \theta_2(t)),$$

-continued
$$V_{B1}(t) = V_{t,0}(t) - 2V_{t,90}(t) - V_{t,180}(t) =$$
$$-2V_i + 2\frac{\omega_{LR,c}}{K_v}\sqrt{2}\sin(\alpha_c(t) + 45°) + 2\frac{\omega_{LR,d}}{K_v}\sqrt{1 + C_{90}^2(t)}\sin(\alpha_d(t) + \theta_1(t)),$$

$$V_{B2}(t) = V_{t,90}(t) + 2V_{t,180}(t) + V_{t,270}(t) =$$
$$4V_i - 2\frac{\omega_{LR,c}}{K_v}\sin\alpha_c(t) - 2\frac{\omega_{LR,d}}{K_v}\sqrt{C_{180}^2(t) + (1 - C_{90}(t))^2}\sin(\alpha_d(t) - \theta_2(t)),$$

where
$$\theta_1(t) = \tan^{-1}C_{90}(t), \theta_2(t) = \tan^{-1}[(1 - C_{90}(t))/C_{180}(t)].$$

Figure 4B:
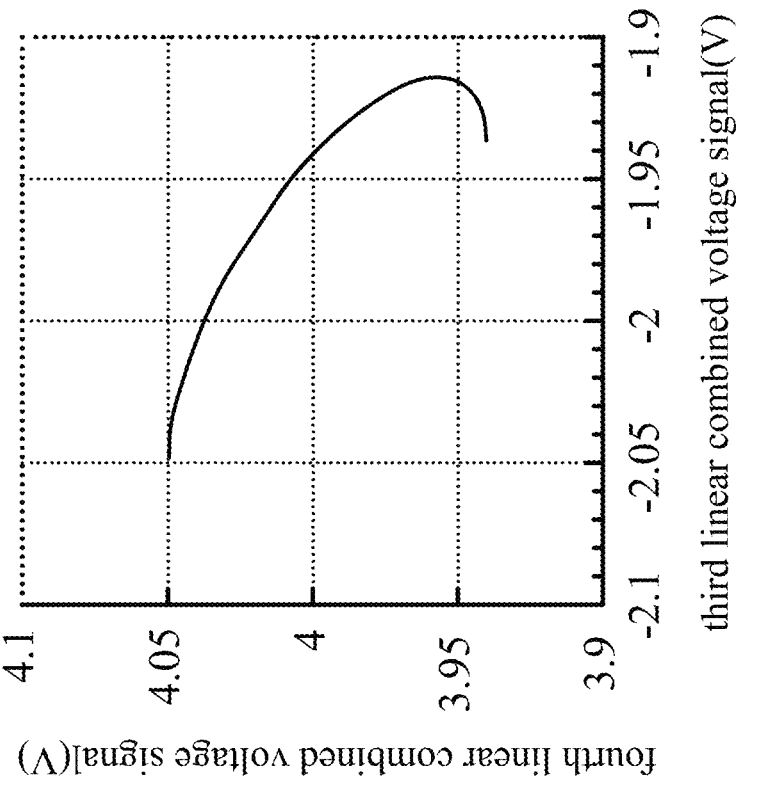
FIG. 4*b* shows a second elliptical trajectory plotted with third and fourth linear combined voltage signals in accordance with one embodiment of the present invention.
Figure 4A:
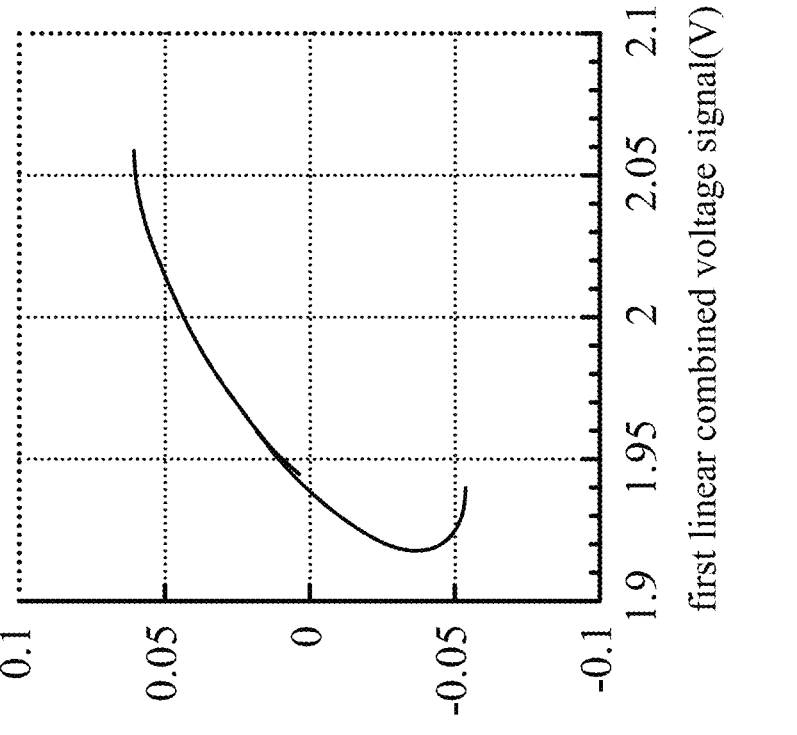
FIG. 4*a* shows a first elliptical trajectory plotted with first and second linear combined voltage signals in accordance with one embodiment of the present invention.

As known from the aforementioned equations, in the linear combinations of the first and third linear combined voltage signals $V_{A1}(t)$ and $V_{B1}(t)$, the first and third voltage signals $V_{t,0}(t)$ and $V_{t,180}(t)$ have the same coefficient and the same plus-minus sign and the second voltage signal $V_{t,90}(t)$ has the same coefficient and different plus-minus signs. And in the linear combinations of the second and fourth linear combined voltage signals $V_{A2}(t)$ and $V_{B2}(t)$, the second and fourth voltage signals $V_{t,90}(t)$ and $V_{t,270}(t)$ have the same coefficient and the same plus-minus sign and the third voltage signal $V_{t,180}(t)$ has the same coefficient and different plus-minus signs. The linear combinations can compress three channels with three different phase delays into an effective channel without null-point issue and clutter effect. A first elliptical trajectory plotted with the first and second linear combined voltage signals $V_{A1}(t)$ and $V_{A2}(t)$ is shown in FIG. 4a, and a second elliptical trajectory plotted with the third and fourth linear combined voltage signals $V_{B1}(t)$ and $V_{B2}(t)$ is shown in FIG. 4b. As shown in FIGS. 4a and 4b, the first and second elliptical trajectories are a right-tilt and left-tile ellipse, respectively, and provided for simplifying the following calibration processing.

With reference to FIGS. 1 and 2, the computing device 200 estimates centers of the first and second elliptical trajectories in the step 13. The computing device 200 applies a DC offset calibration on the first and second linear combined voltage signals $V_{A1}(t)$ and $V_{A2}(t)$ using the center of the first elliptical trajectory to obtain first and second DC offset calibrated signals $V_{A1,r1}(t)$ and $V_{A2,r1}(t)$, and the computing device 200 applies a DC offset calibration on the third and fourth linear combined voltage signals $V_{B1}(t)$ and $V_{B2}(t)$ using the center of the second elliptical trajectory to obtain third and fourth DC offset calibrated signals. Preferably, ellipse fitting is applied to the first and second linear combined voltage signals $V_{A1}(t)$ and $V_{A2}(t)$ to determine the center of the first elliptical trajectory and applied to the third and fourth linear combined voltage signals $V_{B1}(t)$ and $V_{B2}(t)$ to determine the center of the second elliptical trajectory. DC offset causes the centers of the first and second elliptical trajectories to be not located at the origin (0,0), the computing device 200 minus the center value of the first elliptical trajectory in the first and second linear combined voltage signals $V_{A1}(t)$ and $V_{A2}(t)$ and minus the center value of the second elliptical trajectory in the third and fourth linear combined voltage signals $V_{B1}(t)$ and $V_{B2}(t)$, thus the DC offset can be calibrated by moving the centers of the first and second elliptical trajectories to the origin. The first and second DC offset calibrated signals $V_{A1,r1}(t)$ and $V_{A2,r1}(t)$ can be derived as $$\begin{cases} V_{A1,r1}(t) = 2\frac{\omega_{LR,d}}{K_v}\sqrt{1 + C_{90}(t)^2}\sin(\alpha_d(t) - \theta_1(t)) \\ V_{A2,r1}(t) = 2\frac{\omega_{LR,d}}{K_v}\sqrt{C_{180}(t)^2 + (1 - C_{90}(t))^2}\sin(\alpha_d(t) + \theta_2(t)) \end{cases}.$$

Figure 5B:
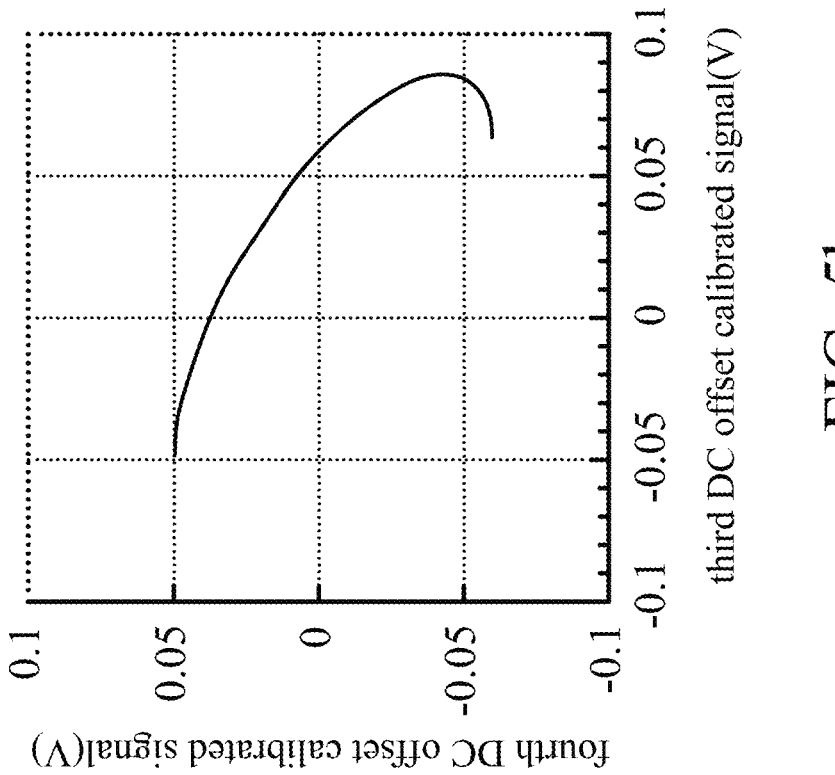
FIG. 5*b* shows a fourth elliptical trajectory plotted with third and fourth DC offset calibrated signals in accordance with one embodiment of the present invention.
Figure 5A:
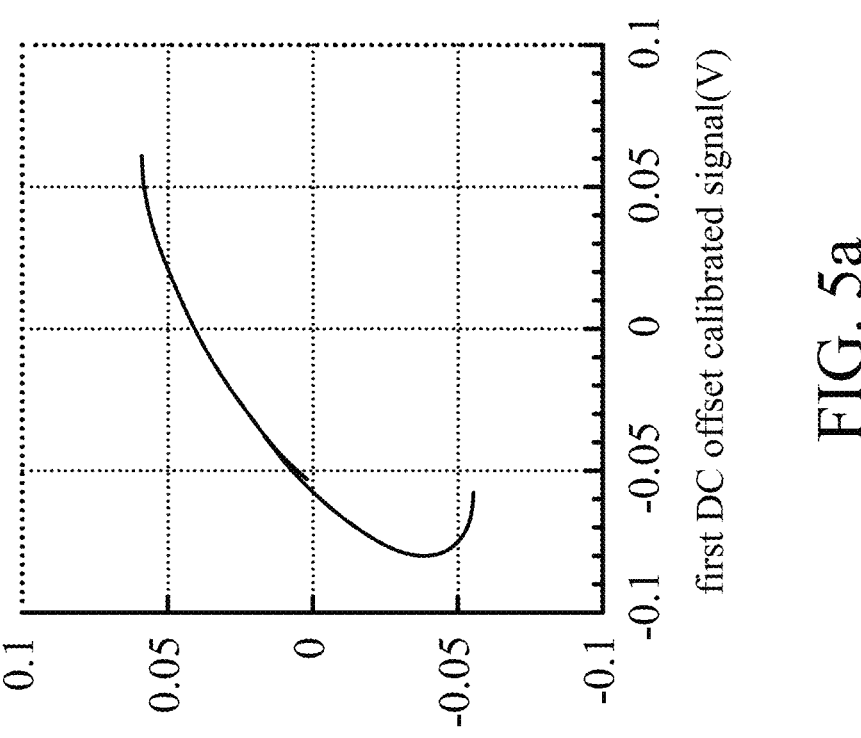
FIG. 5*a* shows a third elliptical trajectory plotted with first and second DC offset calibrated signals in accordance with one embodiment of the present invention.

The equations of the third and fourth DC offset calibrated signals are similar to that of the first and second DC offset calibrated signals $V_{A1,r1}(t)$ and $V_{A2,r1}(t)$ so there is no more detailed description. A third elliptical trajectory plotted with the first and second DC offset calibrated signals $V_{A1,r1}(t)$ and $V_{A2,r1}(t)$ is shown in FIG. 5$a$, and a fourth elliptical trajectory plotted with the third and fourth DC offset calibrated signals is shown in FIG. 5$b$. The DC offset calibration results show the centers of the third and fourth elliptical trajectories are moved to the origin.

With reference to FIGS. 1 and 2, the computing device 200 calculates a first minimum bounding box of the third elliptical trajectory and a second minimum bounding box of the fourth elliptical trajectory in the step 14. The amplitude imbalance between the first and second DC offset calibrated signals $V_{A1,r1}(t)$ and $V_{A2,r1}(t)$ is calibrated according to the first minimum bounding box to obtain first and second amplitude imbalance calibrated signals $V_{A1,r2}(t)$ and $V_{A2,r2}$ (t), and the amplitude imbalance between the third and fourth DC offset calibrated signals is calibrated according to the second minimum bounding box to obtain third and fourth amplitude imbalance calibrated signals.

Figure 6:
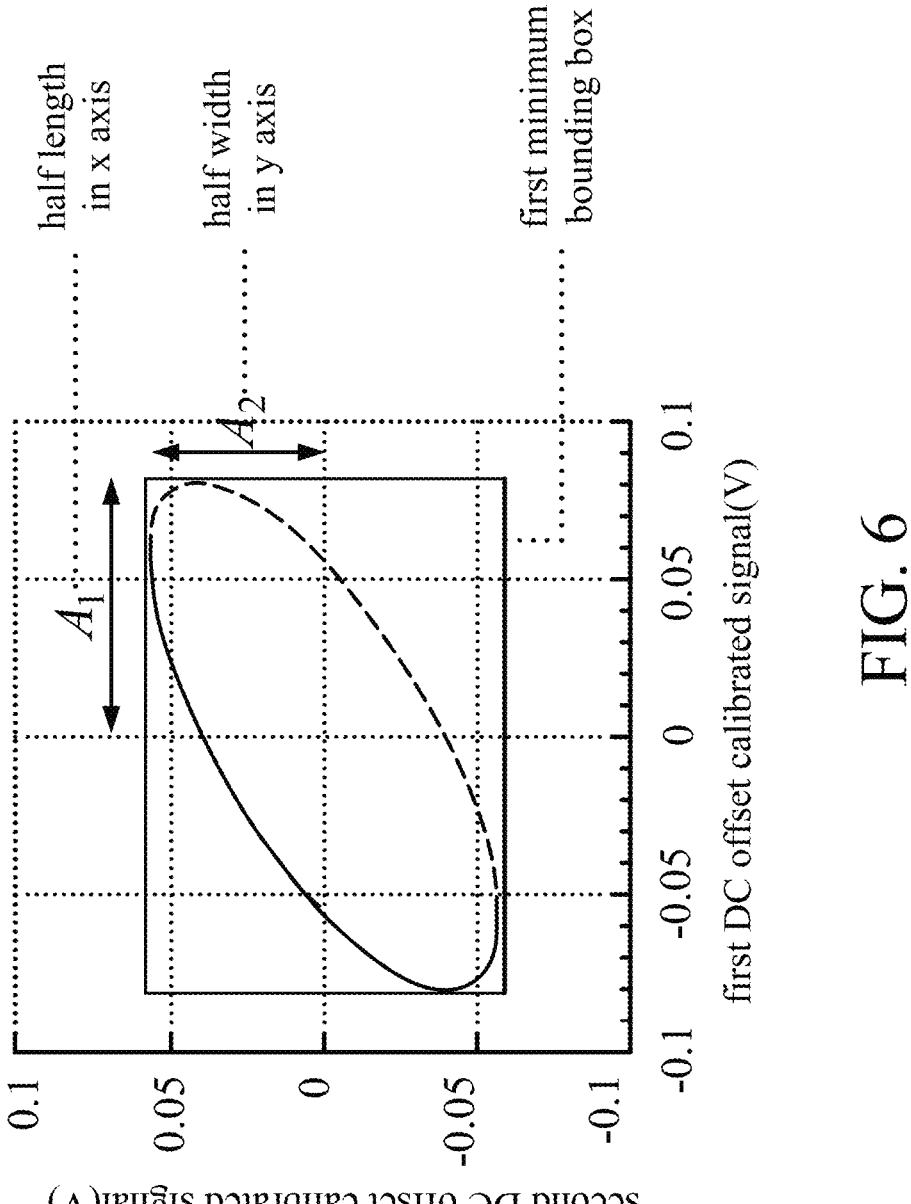
FIG. 6 shows a first minimum bounding box of a third elliptical trajectory plotted with first and second DC offset calibrated signals in accordance with one embodiment of the present invention.

Calculation of the first minimum bounding box for the third elliptical trajectory presents in FIG. 6. As shown in FIG. 6, the third elliptical trajectory have different amplitude values in x and y axis, and the amplitude imbalance between the first and second DC offset calibrated signals $V_{A1,r1}(t)$ and $V_{A2,r1}(t)$ can be calibrated by dividing a half length $A_1$ in x axis and a half width $A_2$ in y axis of the first minimum bounding box to obtain the first and second amplitude imbalance calibrated signals $V_{A1,r2}(t)$ and $V_{A2,r2}(t)$. Consequently, the bounding box of the third elliptical trajectory is modified to be a square with a length to width ratio of 1:1 to calibrate the amplitude imbalance. The first and second amplitude imbalance calibrated signals $V_{A1,r2}(t)$ and $V_{A2,r2}$ (t) are given as $$\begin{cases} V_{A1,r2}(t) = \sin(\alpha_d(t) - \theta_1(t)) \\ V_{A2,r2}(t) = \sin(\alpha_d(t) + \theta_2(t)) \end{cases}.$$

Also, the third and fourth DC offset calibrated signals are calibrated to obtain the third and fourth amplitude imbalance calibrated signals by dividing a half length in x axis and a half width in y axis of the second minimum bounding box of the fourth elliptical trajectory.

Figure 7B:
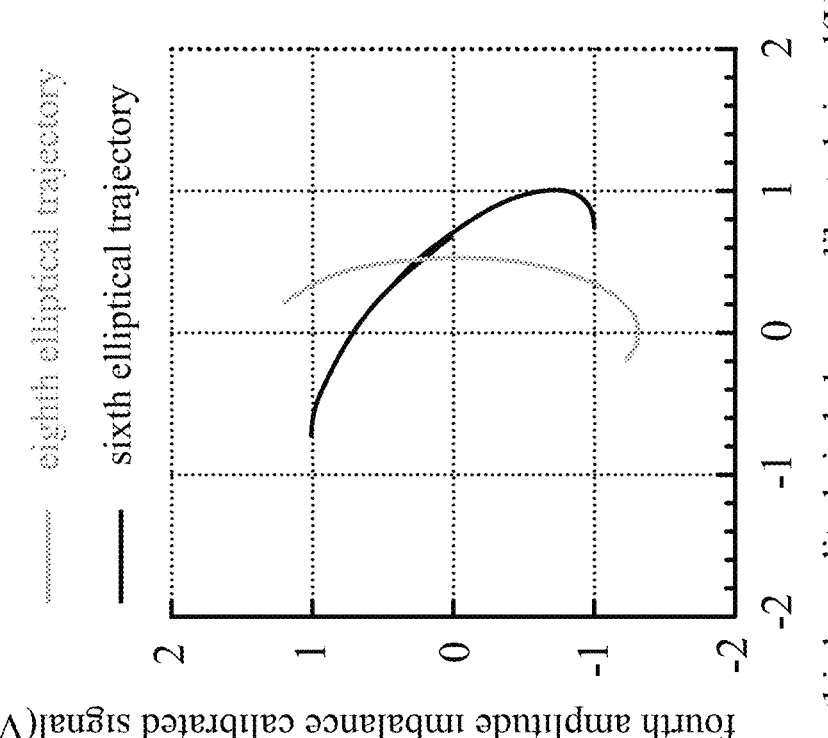
FIG. 7*b* shows a sixth elliptical trajectory plotted with third and fourth amplitude imbalance calibrated signals and an eighth elliptical trajectory plotted with third and fourth phase imbalance calibrated signals in accordance with one embodiment of the present invention.
Figure 7A:
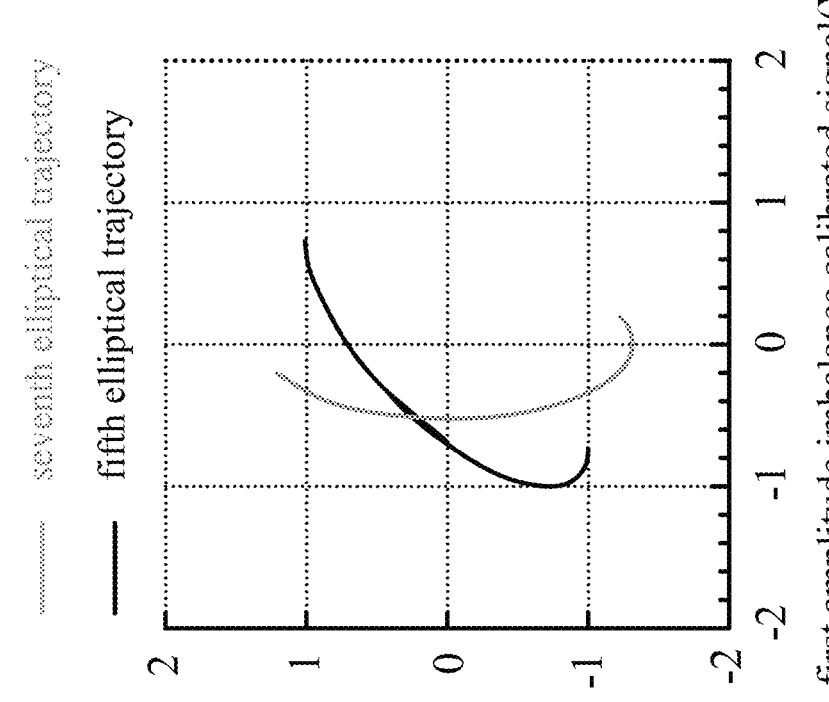
FIG. 7*a* shows a fifth elliptical trajectory plotted with first and second amplitude imbalance calibrated signals and a seventh elliptical trajectory plotted with first and second phase imbalance calibrated signals in accordance with one embodiment of the present invention.

A fifth elliptical trajectory plotted with the first and second amplitude imbalance calibrated signals is presented in the black line of FIG. 7$a$, and a sixth elliptical trajectory plotted with the third and fourth amplitude imbalance calibrated signals are presented in the black line of FIG. 7$b$. As shown in FIGS. 7$a$ and 7$b$, amplitudes of the fifth and sixth elliptical trajectories in x and y axis are equal, indicating that amplitude imbalance is calibrated.

With reference to FIGS. 1 and 2, in the step 15, the computing device 200 rotates the fifth elliptical trajectory to calibrate phase imbalance between the first and second amplitude imbalance calibrated signals $V_{A1,r2}(t)$ and $V_{A2,r2}$ (t) to obtain first and second phase imbalance calibrated signals $V_{A1,r3}(t)$ and $V_{A2,r3}(t)$, and the computing device 200 rotates the sixth elliptical trajectory to calibrate phase imbalance between the third and fourth amplitude imbalance calibrated signals to obtain third and fourth phase imbalance calibrated signals. The fifth elliptical trajectory plotted in the black line of FIG. 7$a$ is a right-tilt ellipse and the sixth elliptical trajectory plotted in the black line of FIG. 7$b$ is a left-tilt ellipse, the computing device 200 anticlockwise rotates the tilt ellipses with 45 degrees using a first rotation matrix to calibrate the phase imbalance between the first and second amplitude imbalance calibrated signals $V_{A1,r2}(t)$ and $V_{A2,r2}(t)$ to obtain the first and second phase imbalance calibrated signals $V_{A1,r3}(t)$ and $V_{A2,r3}(t)$. The rotated result can be expressed as $$\begin{bmatrix} V_{A1,r3}(t) \\ V_{A2,r3}(t) \end{bmatrix} = \begin{bmatrix} \cos\theta_A & -\sin\theta_A \\ \sin\theta_A & \cos\theta_A \end{bmatrix} \begin{bmatrix} V_{A1,r2}(t) \\ V_{A2,r2}(t) \end{bmatrix},$$

where $\theta_A$ is the rotation angle, and the first and second phase imbalance calibrated signals $V_{A1,r3}(t)$ and $V_{A2,r3}(t)$ can be simplified as $$\begin{cases} V_{A1,r3}(t) = \sqrt{2} \, \sin\left(\dfrac{-\theta_1(t) - \theta_2(t)}{2}\right) \cos\left(\alpha_d(t) + \dfrac{-\theta_1(t) + \theta_2(t)}{2}\right) \\ V_{A2,r3}(t) = \sqrt{2} \, \cos\left(\dfrac{-\theta_1(t) - \theta_2(t)}{2}\right) \sin\left(\alpha_d(t) + \dfrac{-\theta_1(t) + \theta_2(t)}{2}\right) \end{cases}.$$

Similarly, the computing device 200 clockwise rotates the tilt ellipses with 45 degrees using a second rotation matrix to calibrate the phase imbalance between the third and fourth amplitude imbalance calibrated signals and obtain the third and fourth phase imbalance calibrated signals. Rotation direction of the first rotation matrix is opposite to that of the second rotation matrix due to the fifth and sixth elliptical trajectories are tilted toward different directions. A seventh elliptical trajectory plotted with the first and second phase imbalance calibrated signals $V_{A1,r3}(t)$ and $V_{A2,r3}(t)$ is shown as the gray line of FIG. 7$a$, and an eighth elliptical trajectory plotted with the third and fourth phase imbalance calibrated signals are shown as the gray line of FIG. 7$b$. The rotated seventh and eighth elliptical trajectories are ellipses with no tilt angle, indicating that the phase imbalance is calibrated.

With reference to FIGS. 1 and 2, the computing device 200 calculates a third minimum bounding box of the seventh elliptical trajectory and a fourth minimum bounding box of the eighth elliptical trajectory in the step 16. The computing device 200 uses the third minimum bounding box to calibrate the amplitude imbalance between the first and second phase imbalance calibrated signals $V_{A1,r3}(t)$ and $V_{A2,r3}(t)$ and obtain fifth and sixth amplitude imbalance calibrated signals $V_{A1,r4}(t)$ and $V_{A2,r4}(t)$. And the computing device 200 uses the fourth minimum bounding box to calibrate the amplitude imbalance between the third and fourth phase imbalance calibrated signals and obtain seventh and eighth amplitude imbalance calibrated signals.

With reference to FIGS. 7$a$ and 7$b$, the rotated seventh and eighth elliptical trajectories have unequal amplitudes in x and y axis, thus the first and second phase imbalance calibrated signals $V_{A1,r3}(t)$ and $V_{A2,r3}(t)$ are calibrated by dividing a half length in x axis and a half width in y axis of the third minimum bounding box to obtain the fifth and sixth amplitude imbalance calibrated signals $V_{A1,r4}(t)$ and $V_{A2,r4}$ (t) which are derived as $$\begin{cases} V_{A1,r4}(t) = \cos\left(\alpha_d(t) + \dfrac{-\theta_1(t) + \theta_2(t)}{2}\right) \\ V_{A2,r4}(t) = \sin\left(\alpha_d(t) + \dfrac{-\theta_1(t) + \theta_2(t)}{2}\right) \end{cases}.$$

Figure 8B:
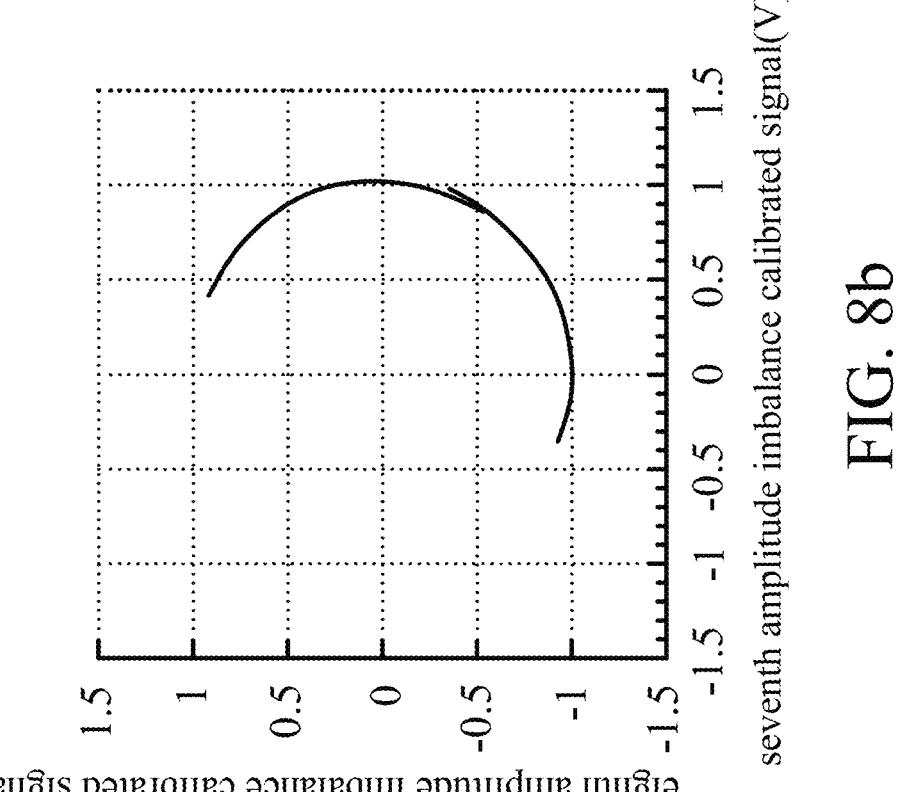
FIG. 8*b* shows a second circle trajectory plotted with seventh and eighth amplitude imbalance calibrated signals in accordance with one embodiment of the present invention.
Figure 8A:
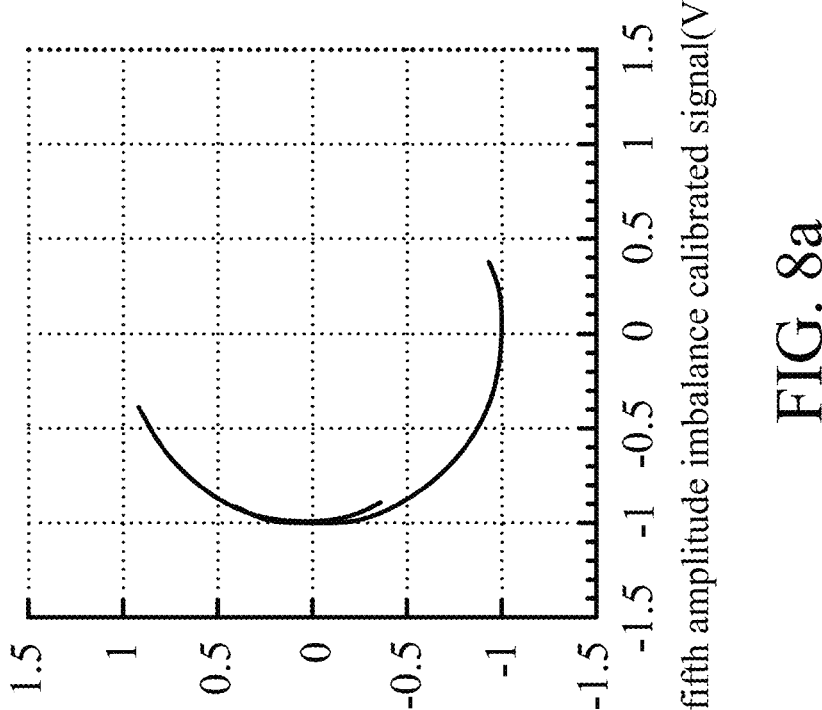
FIG. 8*a* shows a first circle trajectory plotted with fifth and sixth amplitude imbalance calibrated signals in accordance with one embodiment of the present invention.

Likewise, the third and fourth phase imbalance calibrated signals are calibrated by dividing a half length in x axis and a half width in y axis of the fourth minimum bounding box to obtain the seventh and eighth amplitude imbalance calibrated signals. A first circle trajectory plotted with the fifth and sixth amplitude imbalance calibrated signals $V_{A1,r4}(t)$ and $V_{A2,r4}(t)$ is shown in FIG. 8$a$, and a second circle trajectory plotted with the seventh and eighth amplitude imbalance calibrated signals is shown in FIG. 8$b$. The first and second circle trajectories have the same amplitude in x and y axis, that is, amplitude balance is achieved. Furthermore, centers of the first and second circle trajectories are located at the origin (0,0), indicating DC offset, amplitude imbalance and phase imbalance between each other are eliminated.

With reference to FIG. 1, the computing device 200 phase-demodulates the fifth and sixth amplitude imbalance calibrated signals $V_{A1,r4}(t)$ and $V_{A2,r4}(t)$ to obtain a first phase demodulated signal $S_A(t)$ and phase-demodulates the seventh and eighth amplitude imbalance calibrated signals to obtain a second phase demodulated signal $S_B(t)$. In this embodiment, the first phase demodulated signal $S_A(t)$ is obtained by applying a arctangent demodulation to the fifth and sixth amplitude imbalance calibrated signals $V_{A1,r4}(t)$ and $V_{A2,r4}(t)$, and the second phase demodulated signal $S_B(t)$ is obtained by applying a arctangent demodulation to the seventh and eighth amplitude imbalance calibrated signals. The first and second phase demodulated signals $S_A(t)$ and $S_B(t)$ can be expressed as $$S_A(t) = \tan^{-1}\left[\frac{V_{A2,r4}(t)}{V_{A1,r4}(t)}\right] = \alpha_d(t) + \frac{-\theta_1(t) + \theta_2(t)}{2},$$

$$S_B(t) = \tan^{-1}\left[\frac{V_{B2,r4}(t)}{V_{B1,r4}(t)}\right] = \alpha_d(t) + \frac{\theta_1(t) - \theta_2(t)}{2}.$$

And channel correction terms $\theta_1(t)$ and $\theta_2(t)$ still can be seen in the first and second phase demodulated signals $S_A(t)$ and $S_B(t)$.

With reference to FIG. 1, the computing device 200 combines the first and second phase demodulated signals $S_A(t)$ and $S_B(t)$ to recover the Doppler phase in the step 18. As shown in the aforementioned two equations, the correction terms of the first and second phase demodulated signals $S_A(t)$ and $S_B(t)$ have different plus-minus signs and can be eliminated after adding the first and second phase demodulated signals $S_A(t)$ and $S_B(t)$ together. In this embodiment, the first and second phase demodulated signals $S_A(t)$ and $S_B(t)$ are added together and divided equally by the computing device 200 to get a radar phase demodulated signal. Accordingly, the residual clutter can be eliminated to obtain a clear Doppler phase and recover the object's displacement accurately.

In the present invention, linear combination is used to compress the four voltages into two sets linear combined voltage signals to prevent null-point issue and reduce clutter effect. Due to the trajectories of the linear combined voltage signals are tilted ellipses with mirror symmetry, DC offset, amplitude imbalance and phase imbalance can be calibrated through simple computation, and the calibrated signals can be demodulated and combined to completely eliminate clutter effect. Consequently, a rapid and accurate displacement monitoring method is proposed in the present invention.

The scope of the present invention is only limited by the following claims. Any alternation and modification without departing from the scope and spirit of the present invention will become apparent to those skilled in the art.

The invention claimed is:

1. A displacement monitoring method comprising the steps of:

outputting first to fourth voltage signals with a phase difference with each other from a radar to a computing device, the first to fourth voltage signals having a Doppler phase; linearly combining three of the first to fourth voltage signals into first to fourth linear combined voltage signals by the computing device, wherein a first elliptical trajectory is plotted with the first and second linear combined voltage signals and a second elliptical trajectory is plotted with the third and fourth linear combined voltage signals;

estimating centers of the first and second elliptical trajectories by the computing device, the computing device is configured to apply a DC offset calibration on the first and second linear combined voltage signals using the center of the first elliptical trajectory to obtain a first DC offset calibrated signal and a second DC offset calibrated signal, and the computing device is configured to apply a DC offset calibration on the third and fourth linear combined voltage signals using the center of the second elliptical trajectory to obtain a third DC offset calibrated signal and a fourth DC offset calibrated signal, wherein a third elliptical trajectory is plotted with the first and second DC offset calibrated signals and a fourth elliptical trajectory is plotted with the third and fourth DC offset calibrated signals;

calculating a first minimum bounding box of the third elliptical trajectory and a second minimum bounding box of the fourth elliptical trajectory by the computing device, the computing device is configured to calibrate amplitude imbalance between the first and second DC offset calibrated signals using the first minimum bounding box to obtain a first amplitude imbalance calibrated signal and a second amplitude imbalance calibrated signal, the computing device is configured to calibrate amplitude imbalance between the third and fourth DC offset calibrated signals using the second minimum bounding box to obtain a third amplitude imbalance calibrated signal and a fourth amplitude imbalance calibrated signal, wherein a fifth elliptical trajectory is plotted with the first and second amplitude imbalance calibrated signals and a sixth elliptical trajectory is plotted with the third and fourth amplitude imbalance calibrated signals;

rotating the fifth and sixth elliptical trajectories by the computing device, the computing device is configured to calibrate phase imbalance between the first and second amplitude imbalance calibrated signals by rotating the fifth elliptical trajectory to obtain a first phase imbalance calibrated signal and a second phase imbalance calibrated signal, the computing device is configured to calibrate phase imbalance between the third and fourth amplitude imbalance calibrated signals by rotating the sixth elliptical trajectory to obtain a third phase imbalance calibrated signal and a fourth phase imbalance calibrated signal, wherein a seventh elliptical trajectory is plotted with the first and second phase imbalance calibrated signals and an eighth elliptical trajectory is plotted with the third and fourth phase imbalance calibrated signals;

calculating a third minimum bounding box of the seventh elliptical trajectory and a fourth minimum bounding box of the eighth elliptical trajectory by the computing device, the computing device is configured to calibrate amplitude imbalance between the first and second phase imbalance calibrated signals using the third minimum bounding box to obtain a fifth amplitude imbalance calibrated signal and a sixth amplitude imbalance calibrated signal, the computing device is configured to calibrate amplitude imbalance between the third and fourth phase imbalance calibrated signals using the fourth minimum bounding box to obtain a seventh amplitude imbalance calibrated signal and an eighth amplitude imbalance calibrated signal;

phase demodulating the fifth and sixth amplitude imbalance calibrated signals to obtain a first phase demodulated signal and phase demodulating the seventh and eighth amplitude imbalance calibrated signals to obtain a second phase demodulated signal by the computing device; and combining the first and second phase demodulated signals to recover the Doppler phase by the computing device.

2. The displacement monitoring method in accordance with claim 1, wherein a phase difference between the first and second voltage signals is 90 degrees, a phase difference between the second and third voltage signals is 90 degrees, and a phase difference between the third and fourth voltage signals is 90 degrees.

3. The displacement monitoring method in accordance with claim 2, wherein the computing device is configured to linearly combine the first to third voltage signals into the first and third linear combined voltage signals, and the computing device is configured to linearly combine the second to fourth voltage signals into the second and fourth linear combined voltage signals.

4. The displacement monitoring method in accordance with claim 3, wherein the first and third voltage signals have the same coefficient and the same plus-minus sign in linear combinations of the first and third linear combined voltage signals, the second voltage signal has the same coefficient and different plus-minus signs in linear combinations of the first and third linear combined voltage signals, the second and fourth voltage signals have the same coefficient and the same plus-minus sign in linear combinations of the second and fourth linear combined voltage signals, the third voltage signal has the same coefficient and different plus-minus signs in linear combinations of the second and fourth linear combined voltage signals.

5. The displacement monitoring method in accordance with claim 1, wherein the computing device is configured to apply ellipse fitting to the first and second linear combined voltage signals to estimate a center of the first elliptical trajectory and apply ellipse fitting to the third and fourth linear combined voltage signals to estimate a center of the second elliptical trajectory.

6. The displacement monitoring method in accordance with claim 1, wherein the first and second DC offset calibrated signals are calibrated by dividing a half length in x axis and a half width in y axis of the first minimum bounding box of the third elliptical trajectory to obtain the first and second amplitude imbalance calibrated signals, and the third and fourth DC offset calibrated signals are calibrated by dividing a half length in x axis and a half width in y axis of the second minimum bounding box of the fourth elliptical trajectory to obtain the third and fourth amplitude imbalance calibrated signals.

7. The displacement monitoring method in accordance with claim 1, wherein the computing device is configured to rotate the first and second amplitude imbalance calibrated signals with an angle of 45 degrees using a first rotation matrix to obtain the first and second phase imbalance calibrated signals, and the computing device is configured to rotate the third and fourth amplitude imbalance calibrated signals with an angle of 45 degrees using a second rotation matrix to obtain the third and fourth phase imbalance calibrated signals, wherein rotation directions of the first and second rotation matrixes are opposite.

8. The displacement monitoring method in accordance with claim 1, wherein the first and second phase imbalance calibrated signals are calibrated by dividing a half length in x axis and a half width in y axis of the third minimum bounding box of the seventh elliptical trajectory to obtain the fifth and sixth amplitude imbalance calibrated signals, and the third and fourth phase imbalance calibrated signals are calibrated by dividing a half length in x axis and a half width in y axis of the fourth minimum bounding box of the eighth elliptical trajectory to obtain the seventh and eighth amplitude imbalance calibrated signals.

9. The displacement monitoring method in accordance with claim 1, wherein the computing device is configured to arctangent-demodulate the fifth and sixth amplitude imbalance calibrated signals to obtain the first phase demodulated signal, and the computing device is configured to arctangent-demodulate the seventh and eighth amplitude imbalance calibrated signals to obtain the second phase demodulated signal.

10. The displacement monitoring method in accordance with claim 1, wherein the first and second phase demodulated signals are added together and divided by two to obtain a radar phase demodulated signal and recover the Doppler phase.

* * * * *